Dec. 2, 1969
D. W. PRINE
3,482,160
MICROWAVE DIELECTRIC MATERIAL TESTING SYSTEM
Filed Oct. 14, 1965
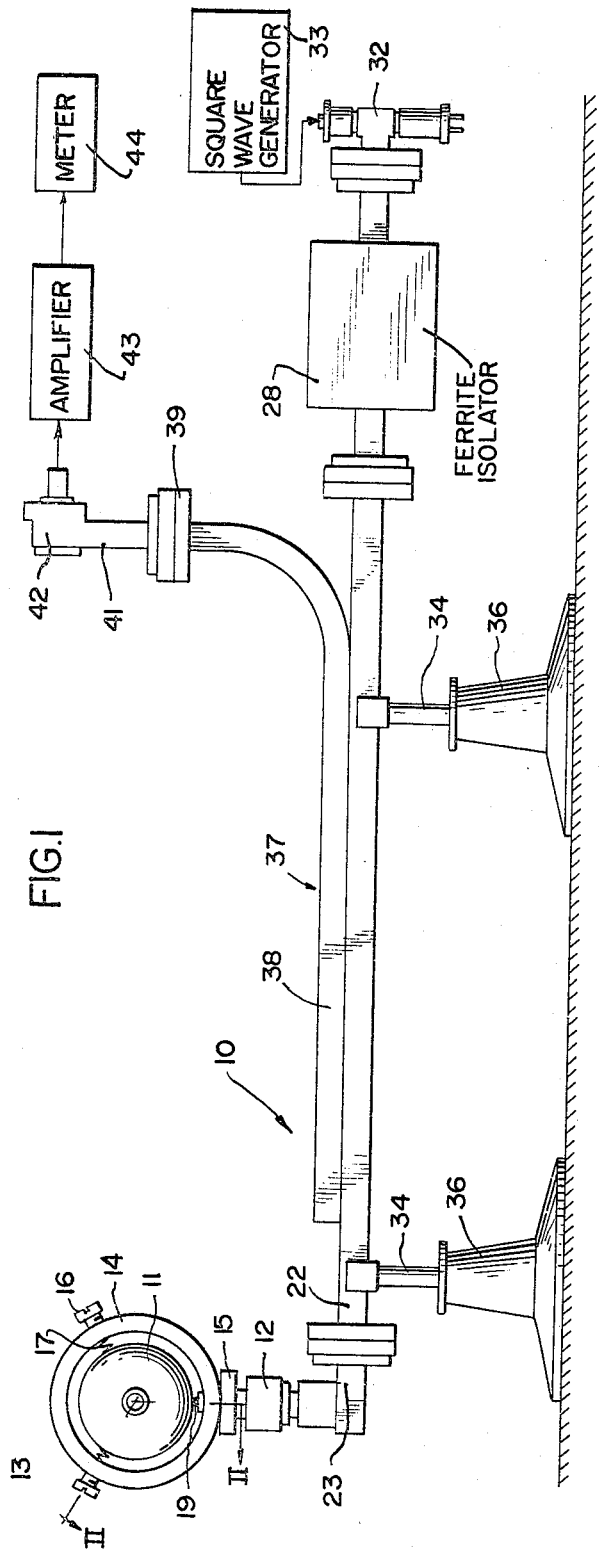
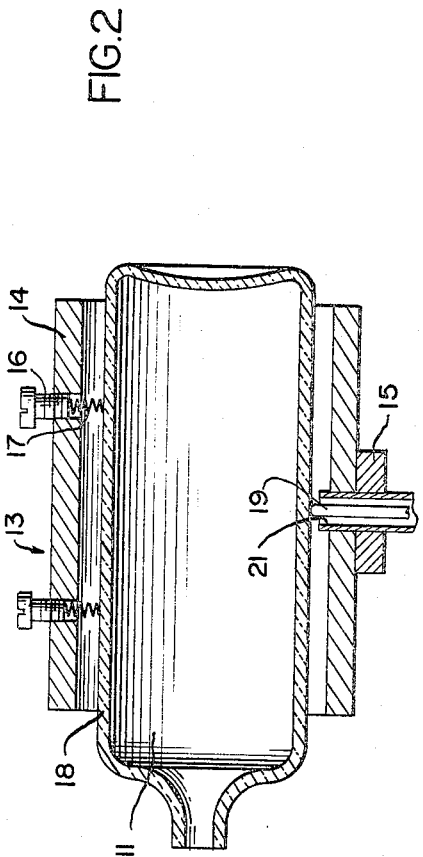
INVENTOR
DAVID W. PRINE
BY
ATTORNEYS United States Patent Office                                                      3,482,160
                                                                        Patented Dec. 2, 1969

1

3,482,160
MICROWAVE DIELECTRIC MATERIAL
TESTING SYSTEM
David W. Prine, Maywood, Ill., assignor to Magnaflux
Corporation, Chicago, Ill., a corporation of Delaware
Filed Oct. 14, 1965, Ser. No. 496,096
Int. Cl. G01r 27/04
U.S. Cl. 324—58.5                                    4 Claims

ABSTRACT OF THE DISCLOSURE

Microwave system for testing dielectric materials, one application being the measurement of the thickness of the wall of a glass bottle which may be inserted in a sleeve having radially inwardly projecting springs operative for pressing the bottle wall into engagement with the end of a coaxial line section inner conductor protruding a short distance from the end of the coaxial line section outer conductor. The section is coupled through a directional coupler and a ferrite isolator to a reflex klystron having a repeller electrode which coupled to an amplitude modulator in the form of a square wave generator. Reflected energy is applied from the directional coupler to a detector which is coupled through an amplifier to an indicator.

---

This invention relates to a microwave testing system and more particularly to a microwave system for the non-destructive testing of objects of dielectric material to determine characteristics hereof. The system of this invention is comparatively simple and inexpensive but is rugged in construction and highly reliable in operation, and permits objects to be readily and quickly tested, with a high degree of accuracy.

Although having other applications, the system was developed with the primary object of accurately measuring the wall thickness of glass bottles, and is particularly advantageous in that application. Previous methods of measurement have often involved breaking the glass or inserting a part of the measuring apparatus inside the bottle. Such methods have been wasteful and time-consuming and have not always yielded accurate results.

According to an important feature of this invention, a wave transmission section is positioned with one end thereof adjacent an object to be tested, such as a wall of glass or other dielectric material, and high frequency energy is transmitted into the section, while measuring the amount of energy reflected from the object back within the section. With this system, the characteristics of the object can be determined non-destructively and with a high degree of accuracy and sensitivity, and with apparatus which is rugged in construction and reliable in operation.

In accordance with specific features of the invention, the cross-sectional dimensions of the end of the wave-transmission section are small in comparison to a wavelength, to minimize radiation and to limit the area tested. At the same time, a very high frequency is used preferably on the order of at least 500 mc. and most preferably on the order of 10 gc. or even higher, which further decreases the area tested and increases sensitivity. By way of example, a frequency of 10.5 gc. may be used and the effective area tested may be on the order of one-sixty fourth of a square inch or even smaller.

The wave transmission section could be a two-wire transmission line or a wave-guide, but preferably, a coaxial line section is used, with an inner conductor protruding a short distance, small in relation to the wavelength of the high frequency energy.

The system is particularly advantageous in the meas-

2 urement of the thickness of walls of dielectric material such as the walls of glass bottles, in that the thickness can be determined with high accuracy and access to only one surface of the wall is required. Such bottles are of course widely used for beer, soft drinks and the like, and have heretofore presented a difficult testing problem.

Another specific feature of the invention is in the provision of a bottle-holding jig having means for resiliently engaging a bottle and holding it in firm engagement with the end of a wave transmission section.

A further feature of the invention is in the modulation of the high frequency energy at a low rate in a manner such that an output signal is obtained which can be amplified by AC amplifier to develop a signal which can be measured with a high degree of accuracy, or which can be applied to suitable control or alarm apparatus.

Still another feature of the invention is the use of a directional coupler for transmitting to a detector only the energy which is reflected from the object under test, and to obtain increased sensitivity and accuracy.

Further features of the invention relate to the use of a system oscillator to generate microwave signals, and to the use of an isolator to protect the oscillator from the effects of reflected signals.

This invention contemplates other objects, features and advantages which will become more fully apparent from the following detailed description taken in conjunction with the accompanying drawings which illustrate a preferred embodiment of the invention and in which:

FIGURE 1 is a combined side-elevational and diagrammatic view of a measurement system for determining the wall thickness of glass bottles; and FIGURE 2 is a sectional view taken substantially along line II—II of FIGURE 1, showing a bottle holder or jig of the system.

Reference numeral 10 generally designates a measurement system for determining the wall thickness of glass bottles, an especially important and useful application of the present invention wherein a bottle 11 is held firmly against one end of a wave transmission section in the form of a coaxial probe 12 while microwave energy from the probe is reflected back from the glass wall of the bottle into the probe, the intensity of reflected energy being inversely related to the thickness of the bottle wall. The intensity of the reflected energy which travels through the probe in the opposite direction from the original generated energy is then measured to determine the thickness of the bottle wall being tested.

The intensity of reflected microwave energy is dependant on many factors other than the thickness of the bottle wall being tested. The intensity obviously depends upon the intensity of generated energy, and it also depends on the characteristics of the glass being tested, the probe size and the probe position relative to the bottle wall. The measuring system of FIGURE 1 is designed to maintain a constant generated intensity and a constant probe position relative to the bottle wall being tested, so that with glass of uniform characteristics, the measuring system does determine the wall thickness by measuring the reflected energy intensity.

It should be understood that the present invention and the measuring system of FIGURE 1 may also be used to measure characteristics of test objects, other than wall thickness and may be used for determining the loss characteristics of dielectric materials and for locating inhomogeneities therein. It should also be noted that the term "wall" is used throughout to refer to any three dimensional object wherein one dimension is small relative to the other two, which are very large relative to the size of the probe 12.

A jig or bottle holder 13 is provided having a cylindrical tube 14 fitted on a collar 15. Screws 16 are threaded into the wall of the tube 14 and serve to move springs 17 against the wall of the bottle 11 to hold the wall of the bottle firmly against a protruding inner conductor 19 of coaxial probe 12 extruding through the collar 15 and the tube 14. With this arrangement the springs 17 allow quick and easy insertion and withdrawal of bottles from the jig 13 without necessitating adjustment of the screws 16. The springs compress to admit the bottle 11 and then hold it firmly against the probe 12 so that the bottle wall is always normal to the probe axis at the contact point. The springs then allow easy removal of the bottle after the tests are completed. The screws 16, moreover, provide for quick adjustment of the jig 13 to bottles of significantly different sizes.

The coaxial probe 12 is positioned to receive high frequency electromagnetic energy waves from a waveguide 22 and to transmit these waves to the wall of bottle 11 from which they are reflected back into the probe 12 and transmitted back to the waveguide 22. According to a specific feature, the cross-sectional dimension of the probe and the distance of protrusion of the inner conductor 19 beyond the outer one are small relative to a wavelength of the transmitted energy in order to prevent radiation from the probe, and to obtain a sensitive and accurate measurement limited in area.

In order to receive energy waves from the waveguide 22 probe 12 is connected to one end of waveguide 22 by a waveguide to coaxial adapter 23 of a type known in the art. The other end of waveguide 22 is connected through a ferrite isolator 28 to a reflex klystron oscillator 32 having a repeller which is electrically connected to a square wave generator 33. Waveguide 22 is positioned to rest on the upper ends of uprights 34 on bases or stands 36, which serve to support the whole measurement system from a supporting surface. Wave guide 22 also forms part of a directional coupler 37 including a second waveguide 38 coupled through suitable apertures to the waveguide 22 in a manner known in the art such that the only energy transmitted to the right in waveguide 38, as viewed in FIGURE 1, is that energy reflected back from the wall of bottle 11.

Waveguide 38 is connected to a detector 41, the output of which is electrically connected through a coaxial adapter 42 to an AC amplifier 43 which is connected finally to a meter 44 which may be a standard vacuum tube volt meter. Detector 41 is of a type known in the art and may include, for example, a crystal diode coupled to receive the microwave signals from waveguide 38.

In operation, the klystron oscillator 32 generates a high frequency voltage signal, which may be 10.5 g.c.p.s., for example. This klystron voltage signal is modulated by a square wave voltage, which may have a frequency of operation of 1000 c.p.s., for example, applied to the klystron repeller by the square wave generator 33. The modulated signal of the klystron resonant cavity is coupled via a standard aperture coupling device to the ferrite isolator 28, which is designed to transmit, undisturbed, electromagnetic waves traveling away from the klystron oscillator 32 but to prevent transmission of any waves traveling in the opposite direction. Isolator 28 therefore protects the klystron 32 by preventing any waves, such as reflected waves, from reaching it and disturbing its stable operation, while transmitting waves from the klystron to the waveguide 22, by which they are transmitted to the waveguide-to-coaxial adapter 23.

The coaxial adapter 23 is a standard form of loop coupling for transfering electromagnetic waves from a waveguide to a coaxial line in which the inner conductor of the coaxial line is brought around to contact one or more walls of the waveguide cavity. Coaxial adapter 23 thereby transfers the waves from waveguide 22 to the non-radiating coaxial probe 12, where they react with the touching wall 18 of the bottle 11. Most of the wave energy is absorbed by the non-conducting bottle wall 18, since glass is highly absorbent of energy in the 10.5 g.c.p.s. range. The amount of energy absorbed by the wall 18 varies directly with wall thickness, and the energy not absorbed is reflected back into the coaxial probe 12. This reflected energy may then be used to determine the thickness of the tested wall 18. Of course, the amount of energy absorbed by the wall 18 depends on factors other than wall thickness, as was explained earlier, but the measuring system is designed to control the probe size and position and the intensity of generated energy so that wall thickness may be determined from the intensity of the reflected energy waves.

To accomplish this determination, the reflected energy is transmitted back through the coaxial probe 12 and the coaxial adapter 23, and into the waveguide 22 where it interacts with the directional coupler 37. Coupler 37 is a standard aperture directional coupler known in the art and is designed to react with waves traveling from the probe 12 in waveguide 22 and to couple a certain portion of the energy of such waves into the diode detector 41. The uncoupled portion of these energy waves travels down waveguide 22 and into the ferrite isolator 28, where it is absorbed. The generated waves, traveling in the opposite direction toward the probe in waveguide 22, are not coupled by directional coupler 37 into the detector 41.

Diode detector 41 is a standard detector known in the art in which a crystal diode receives electromagnetic energy signals from the directional coupler 37 at one of its electrodes and produces an electrical signal in response thereto which has a voltage dependent upon the wave energy intensity. The detector 41 receives the coupled portion of the reflected modulated wave, converting the high frequency voltage signals to a signal of frequency equal to the modulation frequency (1000 c.p.s. for example) and of amplitude proportional to the wave energy intensity.

The modulation-frequency signal, which is much easier to amplify than a high frequency signal, is then amplified by amplifier 43 and transmitted to the meter 44, which indicates directly the voltage of the amplified modulation-frequency signal. Since the amplified signal is directly proportional to the reflected energy intensity which is, for a certain glass consistency, inversely dependent upon the thickness of the bottle wall 18, the meter 44 may be calibrated to read directly the thickness of wall 18 for a wall of a glass of certain characteristics. Different calibrations may also be made for glass having different characteristics.

The modulated energy signal produced by the klystron enables the output signal of detector 41 to be an alternating rather than a direct current signal, obviating the necessity of a direct current amplifier in the measurement system 10, and thereby simplifying the construction and reducing the cost thereof.

As already pointed out above, the principles of this invention can be used to determine many factors other than the thickness of dielectric walls. Also, many modifications and variations are possible in the embodiment of this invention. For example, a dual directional coupler or ratiometer could be used in place of the directional coupler 37 of system 10 to suppress error due to amplitude variations or drift in the source. To insure stability of the klystron source 32, any one of many well known methods can be used, although accuracies of about ±.001 inch are obtained with an unstabilized klystron after suitable warm-up time. Many different sources of high frequency oscillations could be used in place of the klystron oscillator 32.

It will be understood that other modifications and variations may be effected without departing from the spirit and scope of this invention.

I claim as my invention:

1. In a system for testing an object including a wall of solid dielectric material, a coaxial line having an outer conductor and an inner conductor, said outer conductor having a terminal end in a plane generally transverse to the axis of said coaxial line and said inner conductor having a terminal end positioned within a certain short distance from said plane, said terminal ends being positionable in proximity to one surface of said wall of solid dielectric material, means for transmitting high frequency electromagnetic energy into said coaxial line to be propagated through said line toward said wall of dielectric material and to be reflected in part back from said wall through said coaxial line, and means for measuring the proportion of energy reflected back from said wall through said coaxial line, said certain short distance and the cross-sectional dimensions of said coaxial line being small in relation to the wavelength of said high frequency electromagnetic energy to minimize radiation from said coaxial line and to limit the size of the portion of said wall from which energy is reflected back through said coaxial line.

2. In a system as defined in claim 1, said inner conductor having a straight end portion insulated from said outer conductor.

3. In a system as defined in claim 2, holding means for holding said coaxial line in fixed relation to said wall with the axis of said line being normal to said surface of said wall.

4. In a system as defined in claim 3, wherein said wall is the cylindrical wall of a glass bottle or the like, said holding means comprising a tubular sleeve member adapted to coaxially receive a bottle therewithin and having a wall opening in which said coaxial line is fixedly supported with the axis of said line intersecting and perpendicular to the axis of said sleeve, and resilient spring means projecting radially inwardly from said sleeve to engage said cylindrical wall and to hold a point on said wall in firm engagement with said terminal end of said coaxial line inner conductor.

References Cited

UNITED STATES PATENTS

| | | |
|---|---|---|
| 2,596,531 | 5/1952 | Clarke. |
| 2,474,260 | 6/1949 | Leef _____ 324—58.5 |
| 2,611,804 | 9/1952 | Zaleski _____ 324—58.5 |
| 3,025,463 | 3/1962 | Luoma et al. _____ 324—58.5 |
| 3,102,232 | 8/1963 | Leonard et al. _____ 324—58.5 |
| 3,233,172 | 2/1966 | Luoma _____ 324—58 |

RUDOLPH V. ROLINEC, Primary Examiner

P. F. WILLE, Assistant Examiner